US010679620B2

(12) United States Patent
Talwar et al.

(10) Patent No.: US 10,679,620 B2
(45) Date of Patent: Jun. 9, 2020

(54) SPEECH RECOGNITION ARBITRATION LOGIC

(71) Applicant: GM GLOBAL TECHNOLOGY OPERATIONS LLC, Detroit, MI (US)

(72) Inventors: Gaurav Talwar, Novi, MI (US); Xu Fang Zhao, Lasalle (CA); Scott M. Pennock, Lake Orion, MI (US); Kenneth R. Booker, Grosse Pointe Woods, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 262 days.

(21) Appl. No.: 15/913,224

(22) Filed: Mar. 6, 2018

(65) Prior Publication Data

US 2019/0279620 A1  Sep. 12, 2019

(51) Int. Cl.
| | |
|---|---|
| *G10L 15/22* | (2006.01) |
| *G06F 3/0482* | (2013.01) |
| *G10L 15/30* | (2013.01) |
| *G10L 15/18* | (2013.01) |
| *G10L 15/32* | (2013.01) |

(52) U.S. Cl.
CPC ............ *G10L 15/22* (2013.01); *G06F 3/0482* (2013.01); *G10L 15/1815* (2013.01); *G10L 15/30* (2013.01); *G10L 15/32* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 6,185,535 B1* | 2/2001 | Hedin | ..................... | G10L 15/30 704/270 |
| 6,898,567 B2* | 5/2005 | Balasuriya | ............. | G10L 15/30 704/231 |
| 7,003,463 B1* | 2/2006 | Maes | ................ | H04L 29/06027 704/231 |
| 8,868,428 B2* | 10/2014 | Gruenstein | ............. | G10L 15/32 704/275 |
| 2009/0271200 A1* | 10/2009 | Mishra | .................... | G10L 15/30 704/254 |

(Continued)

*Primary Examiner* — Neeraj Sharma
(74) *Attorney, Agent, or Firm* — Reising Ethington P.C.; David Willoughby

(57) ABSTRACT

A method and associated system for recognizing speech using multiple speech recognition algorithms. The method includes receiving speech at a microphone installed in a vehicle, and determining results for the speech using a first algorithm, e.g., embedded locally at the vehicle. Speech results may also be received at the vehicle for the speech determined using a second algorithm, e.g., as determined by a remote facility. The results for both may include a determined speech topic and a determined speech slotted value, along with corresponding confidence levels for each. The method may further include using at least one of the determined first speech topic and the received second speech topic to determine the topic associated with the received speech, even when the first speech topic confidence level of the first speech topic, and the second speech topic confidence level of the second speech topic are both a low confidence level.

17 Claims, 4 Drawing Sheets

(56) References Cited

U.S. PATENT DOCUMENTS

| | | | |
|---|---|---|---|
| 2010/0106497 A1* | 4/2010 | Phillips | G10L 15/30 704/231 |
| 2010/0312555 A1* | 12/2010 | Plumpe | G10L 15/065 704/231 |
| 2011/0015928 A1* | 1/2011 | Odell | G10L 15/30 704/257 |
| 2013/0151250 A1* | 6/2013 | VanBlon | G10L 15/32 704/235 |
| 2013/0281079 A1* | 10/2013 | Vidal | H04W 4/025 455/418 |
| 2015/0269939 A1* | 9/2015 | Gruchalski | B60R 16/0373 704/251 |
| 2016/0071518 A1* | 3/2016 | Schalk | G10L 15/22 704/270.1 |

* cited by examiner

Figure 4

Topic_Arbitration Logic

| | S-HCR | S-MCR | S-LCR (or empty) |
|---|---|---|---|
| E-HCR | | | |
| SERVER_ON_TOP (default) E-MCR | | S-MCR | E-MCR |
| E-LCR (or empty) | | S-MCR | |
| E-HCR | | | |
| EMBEDDED_ON_TOP E-MCR | | E-MCR | E-MCR |
| E-LCR (or empty) | | S-MCR | |

Slot_Arbitration Logic

| | S-HCR | S-MCR | S-LCR (or empty) |
|---|---|---|---|
| E-HCR | | | |
| SERVER_ON_TOP (default) E-MCR | | S-MCR | E-MCR |
| E-LCR (or empty) | | S-MCR | |
| E-HCR | | | |
| EMBEDDED_ON_TOP E-MCR | | E-MCR | E-MCR |
| E-LCR (or empty) | | S-MCR | |

SPEECH RECOGNITION ARBITRATION LOGIC

INTRODUCTION

The present disclosure relates to speech arbitration and, more particularly, to implementing a speech arbitration process that combines results from different speech recognition engines or algorithms.

Traditionally, using multiple speech algorithms or engines requires the use of normalizing results numerically, e.g., with confidence scores. However, normalization of speech recognition confidence scores is highly dependent upon the particular methodologies employed in each algorithm, and thus may not accurately compare speech recognition confidence results from different algorithms. Additionally, normalization of speech recognition confidence scores may result in results associated with relatively lower numerical confidence scores being discarded entirely, based on the expectation that lower confidence scores are reflective of a problem in recognizing the speech, or otherwise not helpful in determining the content of speech.

Accordingly, there is a need for an improved methodology for combining speech recognition results from different speech recognition engines or algorithms.

SUMMARY

In accordance with one aspect of the invention, there is provided a method of recognizing speech using first and second speech recognition algorithms. A method may include receiving speech at a microphone installed in a vehicle, determining speech results using a first algorithm, including a first speech topic and a first speech slotted value, determining a first speech topic confidence level for the first speech topic, and determining a first speech value confidence level for the first speech slotted value. The method may further include receiving second speech results determined with a second algorithm different from the first algorithm, including a second speech topic and a second speech slotted value at the vehicle, receiving a second speech topic confidence level for the second speech topic, and receiving a second speech slotted value confidence level for the second speech slotted value. The method may further include using at least one of the determined first speech topic and the received second speech topic to determine the topic associated with the received speech, even when the first speech topic confidence level of the first speech topic, and the second speech topic confidence level of the second speech topic are both a low confidence level.

In at least some examples, the first speech recognition algorithm is a local speech recognition algorithm determined using a natural language understanding heuristic embedded in electronics installed in the vehicle. In further examples, the second speech recognition algorithm is a remote speech recognition algorithm received from a remote facility at the vehicle.

In some example approaches, the method further includes requesting a user confirmation of the speech topic associated with the received speech when the first speech topic matches the second speech topic.

Example methods may, in some cases, include requesting a user input associated with the first speech topic when the user confirms the first speech topic.

In other examples, when the determined first speech topic is different from the second speech topic, the method may include requesting a user topic selection of the speech topic.

In these examples, in response to the user topic selection, a user menu selection may be provided including a plurality of slotted values associated with the user topic selection. In some approaches, the method may include discarding at least one of the first speech slotted values or the second speech slotted values which are not associated with the user topic selection in response to the user topic selection.

In at least some examples, a method may include determining the local speech topic confidence level and the local speech value confidence level including a high level, a medium level, and a low-level confidence only, and without determining a numerical value for the local speech topic confidence level and the local speech value confidence level.

In at least some examples, a non-transitory computer readable medium contains program instructions for recognizing speech in a vehicle, wherein execution of the program instructions by one or more processors installed to the vehicle causes the one or more processors to carry out the methods disclosed herein. For example, the computer readable medium may cause the one or more processors to receive speech at a microphone installed to the vehicle, determine local speech results, including a local speech topic and a local speech slotted value, using electronics installed in the vehicle, and determine a local speech topic confidence level for the local speech topic, and determining a local speech value confidence level for the local speech slotted value. The processor(s) may further receive remote speech results, including a remote speech topic and a remote speech slotted value at the vehicle, and receive a remote speech topic confidence level for the remote speech topic, and receiving a remote speech slotted value confidence level for the remote speech slotted value. The processor(s) may also use at least one of the determined local speech topic and the received remote speech topic to determine the topic associated with the received speech, even when the local speech topic confidence level of the local speech topic and the remote speech topic confidence level of the remote speech topic are both a low confidence level.

[non] In at least some examples, execution of the program instructions by one or more processors installed to the vehicle causes the one or more processors to carry out the step of requesting a user confirmation of the speech topic associated with the received speech, when the local speech topic matches the remote speech topic. In at least some of these examples, execution of the program instructions by one or more processors installed to the vehicle causes the one or more processors to carry out the step of requesting a user input associated with the local speech topic when the user confirms the local speech topic.

In other example approaches, execution of the program instructions by one or more processors installed to the vehicle causes the one or more processors to carry out the steps of requesting a user topic selection of the speech topic when the determined local speech topic is different from the remote speech topic, and, in response to the user topic selection, providing a user menu selection including a plurality of slotted values associated with the user topic selection.

BRIEF DESCRIPTION OF THE DRAWINGS

One or more embodiments of the invention will hereinafter be described in conjunction with the appended drawings, wherein like designations denote like elements, and wherein:

FIG. 4 is a table illustrating a speech recognition arbitration methodology, according to one example illustration.

DETAILED DESCRIPTION

Figure 1:
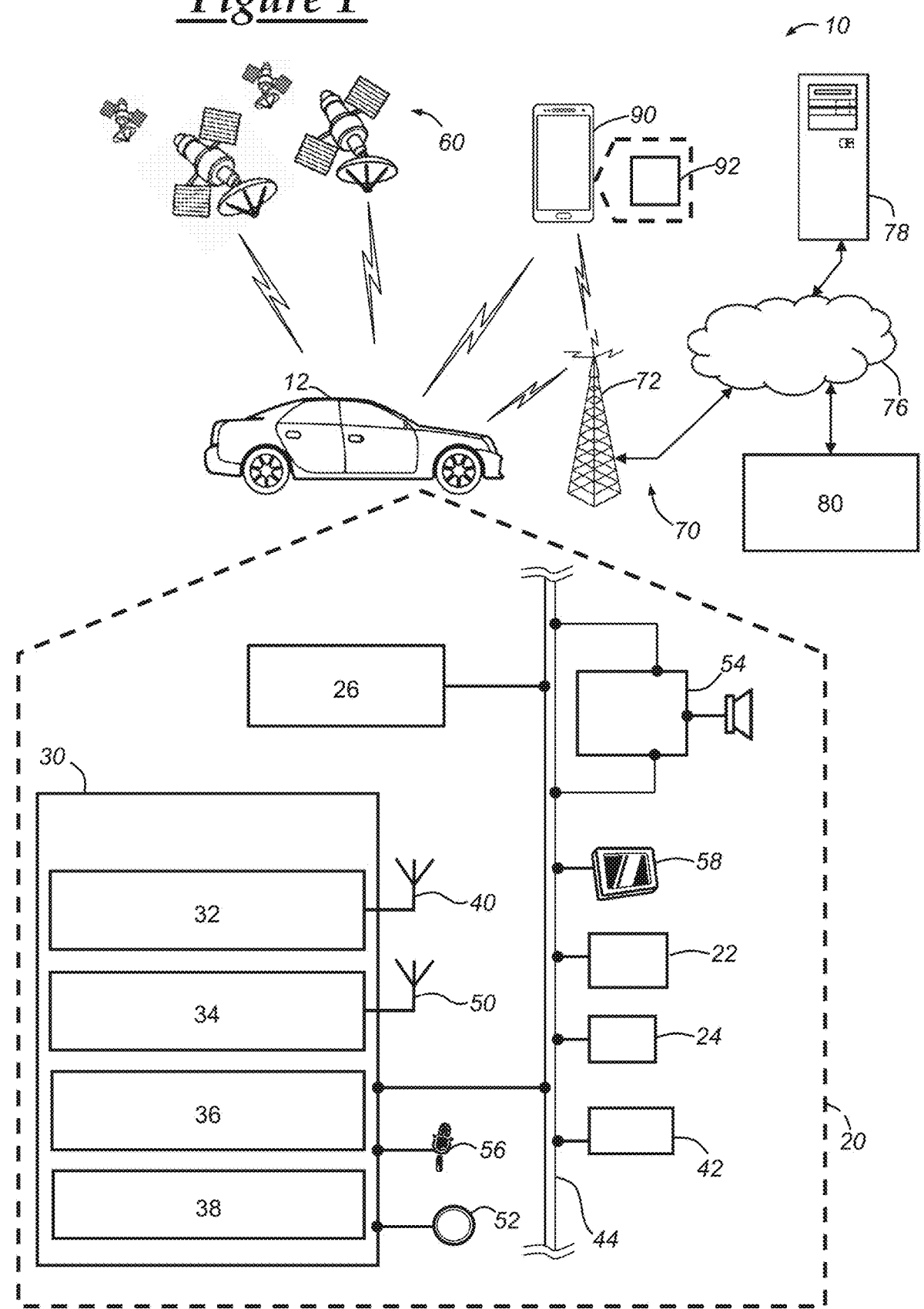
FIG. 1 is a block diagram depicting an embodiment of a communications system that is capable of utilizing the exemplary methods disclosed herein.

Example illustrations are provided below of methods and systems for arbitrating between two separate or different speech recognition engines or algorithms, such as in a vehicle. Speech recognition engines or algorithms may generally interpret speech input, and determine the content of the speech input. Merely as examples, speech recognition algorithms may use finite state grammar (FSG), natural language understanding (NLU), or combinations of the two.

The use of multiple speech recognition engines or algorithms allows use of an embedded or local speech recognition algorithm in a vehicle, in combination with a remote speech recognition algorithm. In some examples, a first speech recognition algorithm is a local algorithm, e.g., by being embedded in vehicle electronics, while a second speech recognition algorithm is provided by way of a remote server or facility.

Remote speech recognition algorithms may have superior processing power to those present in a vehicle by relying upon remote systems that are not limited by being installed to the vehicle. However, remote speech recognition may have disadvantages, such as needing to send speech to a remote facility, which may involve the use fees charged by wireless carrier systems for sending speech from the vehicle to the remote facility. Each time the vehicle sends speech to be analyzed by the remote facility, the vehicle or telematics service provider incurs a charge for doing so. This charge could be based on the length of time needed to send the speech, the amount of data the speech includes, or both. On the other hand, remote facilities that receive speech from the vehicle can maintain more powerful computer processing capabilities drawing on language models that are more sophisticated than what may be available on the vehicle.

Vehicle-based speech processing may have its own disadvantages. While recognizing received speech at the vehicle may minimize the fees charged by wireless carrier systems, the vehicle's computer processing capabilities may be less powerful than those available at the remote facility and the vehicle may use simpler language models that may include less content than what may be available at the remote facility, which may mean less accurate results.

Accordingly, combining both local and remote algorithms may allow a blend of the benefits of each approach, while reducing disadvantages.

In at least some example approaches, a speech recognition arbitration methodology selects results output from different speech recognition engines by selecting one of the results based at least in part upon confidence levels. The confidence levels used for these determinations are contrasted with confidence scores, which in previous approaches would typically determine a numerical value, e.g., from 0 to 100 as an indication of confidence in a result. Confidence "levels" as used herein, on the other hand, do not rely upon numerical or normalized values, in favor of a relatively small number of categories, e.g., "low," "medium," and "high." The low/ medium/high confidence levels may be determined according to any metric that is convenient for the particular speech recognition engine/algorithm being employed.

In some examples, speech recognition results having relative low confidence levels may be used in some circumstances. By contrast, in previous approaches speech recognition results having low confidence scores beneath a certain baseline or threshold would typically be discarded entirely. This discarding of low confidence scores would generally cause the speech recognition session to be terminated or restarted in some cases, reducing the likelihood that a user would successfully complete the speech recognition session. The discarding of low confidence scores was typically done under the expectation that the lower confidence scores were indicative of an inaccurate result or other problem with the speech recognition analysis. However, in some example circumstances described further below, it has been found that speech recognition results having relatively low confidence levels may be useful. Moreover, in these examples the use of results having low confidence levels may increase the rate of speech recognition task completion, i.e., the percentage of speech sessions which end with a successfully identified command.

In example approaches, speech recognition may be generally split between recognition of (1) a topic associated with a speech input (e.g., a navigation command, radio command, phone command, etc.) and (2) the command itself (e.g., to call a contact, obtain directions to a point of interest, tune the radio to a given station, etc.). As discussed further below, the recognition of a command in a speech input is referred to below as recognition of a "slotted value" or "slot" associated with the speech input. Recognition of a topic and slotted value associated with a speech input may be independent of each other. In other words, a separate analysis or even dedicated speech recognition algorithms may be employed to determine the topic and slotted value associated with a given speech input.

In some example approaches, a natural language understanding (NLU) methodology is employed for recognizing both a topic and slotted value associated with a speech input. Natural language understanding methods are contrasted with finite state grammar (FSG), which employ a finite number of recognized commands. Accordingly, as used herein a natural language understanding (NLU) methodology or heuristic may generally not be limited by a finite number of recognized commands, and is therefore generally configured to respond to voice commands included in a received speech input. Nevertheless, some examples may rely at least partially upon a finite state grammar (FSG) methodology, i.e., where a finite number of commands are available to a user, and the methodology or heuristic therefore seeks to match speech input with one of the available commands.

As those skilled in the art will appreciate, in addition to being embedded in vehicle electronics, example speech arbitration processes or applications can be implemented into a variety of different client devices, including handheld mobile devices (e.g., smartphones), home automation devices (e.g., intelligent personal assistants such as Amazon™ Alexa™ and Google™ Home), vehicles, and/or any device that can receive speech, connect to a remote computer network, and be configured to implement the speech arbitration processes or applications discussed herein.

In some examples, first and second automatic speech recognition (ASR) algorithms represent a local or vehicle-embedded speech recognition algorithm and a remote speech recognition algorithm, respectively. In these approaches, results from each may be used to determine content of speech depending on confidence levels (e.g., low, medium, and high) associated with a speech topic result and a speech slotted value result for each.

Communications System—

With reference to FIG. 1, there is shown an operating environment that comprises a communications system 10 and that can be used to implement the method disclosed herein. Communications system 10 generally includes a vehicle 12 with a body control module (BCM) 26 and a wireless communications device 30, a constellation of global navigation satellite system (GNSS) satellites 60, one or more wireless carrier systems 70, a land communications network 76, a computer 78, a remote facility 80, and a personal mobile device 90. It should be understood that the disclosed method can be used with any number of different systems and is not specifically limited to the operating environment shown here. Also, the architecture, construction, setup, and general operation of the system 10 and its individual components are generally known in the art. Thus, the following paragraphs simply provide a brief overview of one such communications system 10; however, other systems not shown here could employ the disclosed method as well.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which can include telematics equipment in vehicle 12). Carrier system 70 can implement any suitable communications technology, including GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to remote facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), or networks providing broadband wireless access (BWA), or any combination thereof.

Computers 78 (only one shown) can be some of a number of computers accessible via a private or public network such as the Internet. Each such computer 78 can be a client device that can perform speech processing and/or speech arbitration, or which can be used for one or more purposes, such as a remote server accessible (e.g., a remote speech processing server) by vehicle 12. Other such accessible computers 78 can be, for example: a third party server that can be used to provide location services; a service center computer where diagnostic information and other vehicle data can be uploaded from the vehicle; a client computer used by the vehicle owner or other subscriber for such purposes as accessing or receiving vehicle data or to setting up or configuring subscriber preferences or controlling vehicle functions; a car sharing server which coordinates registrations from a plurality of users who request to use a vehicle as part of a car sharing service; or a third party repository to or from which vehicle data or other information is provided, whether by communicating with the vehicle 12, remote facility 80, or both. A computer 78 can also be used for providing Internet connectivity such as DNS services or as a network address server that uses DHCP or other suitable protocol to assign an IP address to the vehicle 12.

Remote facility 80 may be designed to provide the vehicle electronics 20 and mobile device 90 with a number of different system back-end functions through use of one or more electronic servers. For example, remote facility 80 may be used in part to facilitate or coordinate information sent between vehicle 12 and one or more client devices, such as mobile device 90 or computer 78. In one embodiment, the remote facility 80 can provide speech recognition services, which can include receiving speech signals from a client device and processing the received speech signals using a speech recognition system. Additionally, or alternatively, the remote facility 80 may include one or more switches, servers, databases, live advisors, as well as an automated voice response system (VRS), all of which are known in the art. Remote facility 80 may include any or all of these various components and, preferably, each of the various components are coupled to one another via a wired or wireless local area network. Remote facility 80 may receive and transmit data via a modem connected to land network 76.

Remote facility 80 can also include one or more databases that can store account information such as subscriber authentication information, vehicle identifiers, profile records, behavioral patterns, speech recognition and/or arbitration information, and other pertinent subscriber information. As used herein, speech recognition and/or arbitration information includes information that can be used for training a speech recognition or speech arbitration system, such as the neural network speech arbitration process discussed in detail below. Data transmissions may also be conducted by wireless systems, such as IEEE 802.11x, GPRS, and the like. Those skilled in the art will appreciate that, although only one remote facility 80 and one computer 78 are depicted in the illustrated embodiment, numerous remote facilities 80 and/or computers 78 may be used.

The personal mobile device 90 is a mobile device and may include: hardware, software, and/or firmware enabling cellular telecommunications and SRWC as well as other mobile device applications. As used herein, a personal mobile device is a mobile device that is capable of SRWC, that is portable by a user, and where the portability of the device is at least partly dependent on the user, such as a wearable device (e.g., a smartwatch), an implantable device, or a handheld device (e.g., a smartphone, a tablet, a laptop). As used herein, a short-range wireless communications (SRWC) device is a device capable of SRWC. Personal mobile device 90 can be a client device and can include a processor and memory (e.g., non-transitory computer readable medium configured to operate with the processor) for storing the software, firmware, etc. The personal mobile device's processor and memory may enable various software applications 92, which may be preinstalled or installed by the user (or manufacturer) (e.g., having a software application or graphical user interface (GUI)).

One implementation of a mobile device application 92 may enable receiving speech and processing the received speech using speech recognition techniques, some of which may include speech arbitration according to various embodiments of the method discussed herein. For example, the mobile device can include a microphone that enables the reception of speech waves that are generated by one or more users. Speech arbitration can be carried out at the mobile device according to the neural network speech arbitration process discussed below. In some embodiments, application 92 or another mobile device application can include a graphical user interface that allows a user to enter credentials, submit credentials for authorization and/or authentication, connect to vehicle 12, view vehicle status information, request vehicle functions to be carried out, and/or configure one or more vehicle settings. Mobile device 90 may communicate with wireless communications device 30 according to one or more SRWC technologies or wired connections, such as a connection using a Universal Serial Bus (USB) cable. Although a single mobile device 90 is shown, communications 10 can include a plurality of mobile devices 90.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 20 are shown generally in FIG. 1 and includes a global navigation satellite system (GNSS) module 22, engine control unit (ECU) 24, a body control module (BCM) 26, a wireless communications device 30 that can be configured to perform neural network speech arbitration and/or speech recognition processing, other vehicle system modules (VSMs) 42, and numerous other components and devices. Some or all of the different vehicle electronics may be connected for communication with each other via one or more communication busses, such as bus 44. Communications bus 44 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

The vehicle 12 can include numerous vehicle system modules (VSMs) as part of vehicle electronics 20, such as the GNSS module 22, ECU 24, BCM 26, wireless communications device 30, and vehicle user interfaces 52-58, as will be described in detail below. The vehicle 12 can also include other VSMs 42 in the form of electronic hardware components that are located throughout the vehicle and, which may receive input from one or more sensors and use the sensed input to perform diagnostic, monitoring, control, reporting, and/or other functions. Each of the VSMs 42 can be connected to the other VSMs via communications bus 44, and can be programmed to run vehicle system and subsystem diagnostic tests. One or more VSMs 42 may periodically or occasionally have their software or firmware updated and, in some embodiments, such vehicle updates may be over the air (OTA) updates that are received from a computer 78 or remote facility 80 via land network 76 and communications device 30. As is appreciated by those skilled in the art, the above-mentioned VSMs are only examples of some of the modules that may be used in vehicle 12, as numerous others are also possible.

Global navigation satellite system (GNSS) module 22 receives radio signals from a constellation of GNSS satellites. In one embodiment, the GNSS module 22 may be a global positioning system (GPS) module, which may receive GPS signals from a constellation of GPS satellites 60. From these signals, the module 22 can determine vehicle position which may enable the vehicle to determine whether it is at a known location, such as home or workplace. Moreover, GNSS module 22 can provide this location data (e.g., geographical coordinates) to wireless communications device 30, which can then use this data to identify known locations, such as a vehicle operator's home or workplace. Additionally, GNSS module 22 may be used to provide navigation and other position-related services to the vehicle operator. Navigation information can be presented on the display 58 (or other display within the vehicle) or can be presented verbally such as is done when supplying turn-by-turn navigation. The navigation services can be provided using a dedicated in-vehicle navigation module (which can be part of GNSS module 22), or some or all navigation services can be done via a telematics unit installed in the vehicle, wherein the position information is sent to a remote location for purposes of providing the vehicle with navigation maps, map annotations (points of interest, restaurants, etc.), route calculations, and the like. The location information can be supplied to remote facility 80 or other remote computer system, such as computer 78, for other purposes, such as fleet management and/or for use in a car sharing service. Also, new or updated map data can be downloaded to the GNSS module 22 from the remote facility 80 via a vehicle telematics unit.

Vehicle electronics 20 also includes a number of vehicle user interfaces that provide vehicle occupants with a means of providing and/or receiving information, including pushbutton(s) 52, audio system 54, microphone 56, and visual display 58. As used herein, the term "vehicle user interface" broadly includes any suitable form of electronic device, including both hardware and software components, which is located on the vehicle and enables a vehicle user to communicate with or through a component of the vehicle. The pushbutton(s) 52 allow manual user input into the communications device 30 to provide other data, response, or control input. Audio system 54 provides audio output to a vehicle occupant and can be a dedicated, stand-alone system or part of the primary vehicle audio system. According to the particular embodiment shown here, audio system 54 is operatively coupled to both vehicle bus 44 and an entertainment bus (not shown) and can provide AM, FM and satellite radio, CD, DVD and other multimedia functionality. This functionality can be provided in conjunction with or independent of an infotainment module. Microphone 56 provides audio input to the wireless communications device 30 to enable the driver or other occupant to provide voice commands and/or carry out hands-free calling via the wireless carrier system 70, and which can be processed using speech arbitration and recognition techniques, as discussed more below. Microphone 56 can be connected to an on-board automated voice processing unit utilizing human-machine interface (HMI) technology known in the art. Visual display or touch screen 58 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Body control module (BCM) 26 is shown in the exemplary embodiment of FIG. 1 as being electrically coupled to communication bus 44. In some embodiments, the BCM 26 may be integrated with or part of a center stack module (CSM) and/or integrated with wireless communications device 30. Or, the BCM and CSM may be separate devices that are connected to one another via bus 44. BCM 26 can include a processor and/or memory, which can be similar to processor 36 and memory 38 of wireless communications device 30, as discussed below. BCM 26 may communicate with wireless communications device 30 and/or one or more vehicle system modules, such as GNSS 22, audio system 54, or other VSMs 42. The processor and memory of BCM 36 can be used to direct or carry out one or more vehicle operations including, for example, controlling central locking, air conditioning, power mirrors, controlling the vehicle ignition or primary mover (e.g., engine, primary propulsion system), and/or controlling various other vehicle modules. BCM 26 may receive data from wireless communications device 30 and, subsequently, send the data to one or more vehicle modules.

Additionally, BCM 26 may provide information corresponding to the vehicle state or of certain vehicle components or systems. For example, the BCM may provide the wireless communications device 30 with information indicating whether the vehicle's ignition is turned on, the gear the vehicle is presently in (i.e. gear state), and/or other information regarding the vehicle. The BCM 26 may be used to determine one or more vehicle states, such as whether the vehicle is powered on, the battery power of a vehicle battery, and/or other vehicle states. These various vehicle states can be obtained wireless communications device 30 and used as an input in the neural network speech arbitration process.

Wireless communications device 30 is capable of communicating data via short-range wireless communications (SRWC) and, in some embodiments, may be capable of communicating data via cellular network communications. As shown in the exemplary embodiment of FIG. 1, wireless communications device 30 includes an SRWC circuit 32, a cellular chipset 34, a processor 36, memory 38, and antennas 40 and 50. In some embodiments, the wireless communications device 30 may be specifically configured to carry out at least part of the method disclosed herein. In one embodiment, wireless communications device 30 may be a stand-alone module or, in other embodiments, device 30 may be incorporated or included as a part of one or more other vehicle system modules, such as a center stack module (CSM), BCM 26, an infotainment module, a telematics unit, a head unit, and/or a gateway module. In some embodiments, the device 30 can be implemented as an OEM-installed (embedded) or aftermarket device that is installed in the vehicle.

Wireless communications device 30 can be configured to communicate wirelessly according to one or more wireless protocols, including short-range wireless communications (SRWC) such as any of the IEEE 802.11 protocols, Wi-Fi™, WiMAX™, ZigBee™, Wi-Fi Direct™, Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. The short-range wireless communication circuit 32 enables the wireless communications device 30 to transmit and receive SRWC signals, such as BLE signals. The SRWC circuit may allow the device 30 to connect to another SRWC device. Additionally, in some embodiments, the wireless communications device may contain a cellular chipset 34 thereby allowing the device to communicate via one or more cellular protocols, such as those used by cellular carrier system 70.

Wireless communications device 30 may enable vehicle 12 to be in communication with one or more remote networks via packet-switched data communication. This packet-switched data communication may be carried out through use of a non-vehicle wireless access point that is connected to a land network via a router or modem. When used for packet-switched data communication such as TCP/IP, the communications device 30 can be configured with a static IP address or can be set up to automatically receive an assigned IP address from another device on the network such as a router or from a network address server.

Packet-switched data communications may also be carried out via use of a cellular network that may be accessible by the device 30. Communications device 30 may, via cellular chipset 34, communicate data over wireless carrier system 70. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art. It should be appreciated that mobile device 90 can include a cellular chipset and/or other communicating means that can be used for packet-switched data communications.

Processor 36 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 36 executes various types of digitally-stored instructions, such as software or firmware programs stored in memory 38, which enable the device 30 to provide a wide variety of services. For instance, at least in one embodiment, processor 36 can execute programs or process data to carry out at least a part of the method discussed herein, which can include performing speech arbitration using a neural network model. Memory 38 may include RAM, other temporary powered memory, any non-transitory computer-readable medium (e.g., EEPROM), or any other electronic computer medium that stores some or all of the software needed to carry out the various external device functions discussed herein.

In one embodiment, the wireless communications device 30 may operate both when the vehicle is in a powered on state and when the vehicle is in a powered off state. As used herein, a "powered on state" is a state of the vehicle in which the ignition or primary propulsion system of the vehicle is powered on and, as used herein, a "powered off state" is a state of the vehicle in which the ignition or primary propulsion system of the vehicle is not powered on. The operation or state of the wireless communications device 30 may be controlled by another vehicle system module, such as by BCM 26 or by an infotainment module. In the powered on state, the wireless communications device 30 may always be kept "on" or supplied with power from a vehicle battery or other power source. In the powered off state, the wireless communications device 30 may be kept in a low-power mode or may be supplied power periodically so that device 30 may wake up and perform operations.

Figure 2:
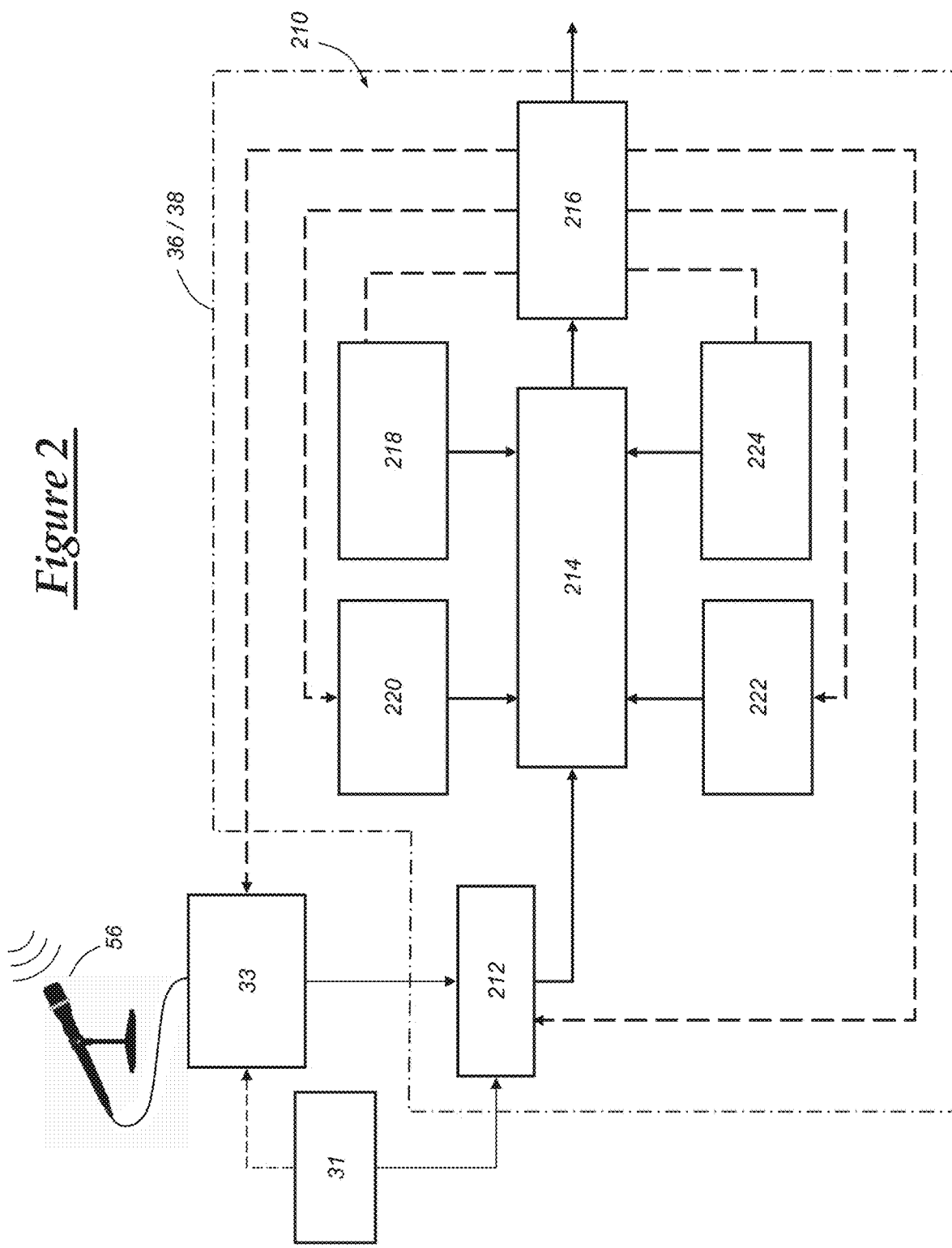
FIG. 2 is a block diagram depicting an embodiment of an automatic speech recognition (ASR) system.

Turning now to FIG. 2, there is shown an illustrative architecture for an ASR system 210 that can be used to enable the presently disclosed method. Although the ASR system 210 is discussed below with respect to wireless communications device 30 of vehicle 12, the ASR system 210 can be incorporated into any client device, such as those discussed above including mobile device 90 and computers 78. An ASR system that is similar or the same to ASR system 210 can be incorporated into one or more remote speech processing servers, including one or more servers located at remote facility 80. In general, a vehicle occupant vocally interacts with an automatic speech recognition (ASR) system for one or more of the following fundamental purposes: training the system to understand a vehicle occupant's particular voice; storing discrete speech such as a spoken nametag or a spoken control word like a numeral or keyword; or recognizing the vehicle occupant's speech for any suitable purpose such as voice dialing, menu navigation, transcription, service requests, vehicle device or device function control, or the like. Generally, ASR extracts acoustic data from human speech, compares and contrasts the acoustic data to stored subword data, selects an appropriate subword which can be concatenated with other selected subwords, and outputs the concatenated subwords or words for post-processing such as dictation or transcription, address book dialing, storing to memory, training ASR models or adaptation parameters, or the like.

ASR systems are generally known to those skilled in the art, and FIG. 2 illustrates just one specific illustrative ASR system 210. The system 210 includes a device to receive speech such as the vehicle microphone 56, and an acoustic interface 33 such as a sound card of the wireless communications device 30 having an analog to digital converter to digitize the speech into acoustic data. The system 210 also includes a memory such as the vehicle memory 38 for storing the acoustic data and storing speech recognition software and databases, and a processor such as the vehicle processor 36 to process the acoustic data. The processor functions with the memory and in conjunction with the following modules: one or more front-end processors or pre-processor software modules 212 for parsing streams of the acoustic data of the speech into parametric representations such as acoustic features; one or more decoder software modules 214 for decoding the acoustic features to yield digital subword or word output data corresponding to the input speech utterances; and one or more post-processor software modules 276 for using the output data from the decoder module(s) 214 for any suitable purpose.

The system 210 can also receive speech from any other suitable audio source(s) 31, which can be directly communicated with the pre-processor software module(s) 212 as shown in solid line or indirectly communicated therewith via the acoustic interface 33. The audio source(s) 31 can include, for example, a telephonic source of audio such as a voice mail system, or other telephonic services of any kind.

One or more modules or models can be used as input to the decoder module(s) 214. First, grammar and/or lexicon model(s) 278 can provide rules governing which words can logically follow other words to form valid sentences. In a broad sense, a grammar can define a universe of vocabulary the system 210 expects at any given time in any given ASR mode. For example, if the system 210 is in a training mode for training commands, then the grammar model(s) 278 can include all commands known to and used by the system 210. In another example, if the system 210 is in a main menu mode, then the active grammar model(s) 278 can include all main menu commands expected by the system 210 such as call, dial, exit, delete, directory, or the like. Second, acoustic model(s) 280 assist with selection of most likely subwords or words corresponding to input from the pre-processor module(s) 212. Third, word model(s) 222 and sentence/language model(s) 224 provide rules, syntax, and/or semantics in placing the selected subwords or words into word or sentence context. Also, the sentence/language model(s) 224 can define a universe of sentences the system 210 expects at any given time in any given ASR mode, and/or can provide rules, etc., governing which sentences can logically follow other sentences to form valid extended speech.

According to an alternative illustrative embodiment, some or all of the ASR system 210 can be resident on, and processed using, computing equipment in a location remote from the vehicle 12, such as the computer 78 or the remote facility 80. For example, grammar models, acoustic models, and the like can be stored in memory of one of the servers and/or databases in the remote facility 80 and communicated to the vehicle wireless communications device 30 for in-vehicle speech processing. Similarly, speech recognition software can be processed using processors of one of the remote servers in the remote facility 80. In other words, the ASR system 210 can be resident in the wireless communications device 30, distributed across the computer 78/remote facility 80 and the vehicle 12 in any desired manner, and/or resident at the computer 78 or remote facility 80.

First, acoustic data is extracted from human speech wherein a vehicle occupant speaks into the microphone 56, which converts the utterances into electrical signals and communicates such signals to the acoustic interface 33. A sound-responsive element in the microphone 56 captures the occupant's speech utterances as variations in air pressure and converts the utterances into corresponding variations of analog electrical signals such as direct current or voltage. The acoustic interface 33 receives the analog electrical signals, which are first sampled such that values of the analog signal are captured at discrete instants of time, and are then quantized such that the amplitudes of the analog signals are converted at each sampling instant into a continuous stream of digital speech data. In other words, the acoustic interface 33 converts the analog electrical signals into digital electronic signals. The digital data are binary bits which are buffered in the memory 38 of wireless communications device 30 and then processed by the processor 36 of wireless communications device 30 or can be processed as they are initially received by the processor 36 in real-time.

Second, the pre-processor module(s) 212 transforms the continuous stream of digital speech data into discrete sequences of acoustic parameters. More specifically, the processor 36 executes the pre-processor module(s) 212 to segment the digital speech data into overlapping phonetic or acoustic frames of, for example, 10-30 millisecond (ms) duration. The frames correspond to acoustic subwords such as syllables, demi-syllables, phones, diphones, phonemes, or the like. The pre-processor module(s) 212 also performs phonetic analysis to extract acoustic parameters from the occupant's speech such as time-varying feature vectors, from within each frame. Utterances within the occupant's speech can be represented as sequences of these feature vectors. For example, and as known to those skilled in the art, feature vectors can be extracted and can include, for example, vocal pitch, energy profiles, spectral attributes, and/or cepstral coefficients that can be obtained by performing Fourier transforms of the frames and decorrelating acoustic spectra using cosine transforms. Acoustic frames and corresponding parameters covering a particular duration of speech are concatenated into unknown test pattern of speech to be decoded.

Third, the processor executes the decoder module(s) 214 to process the incoming feature vectors of each test pattern. The decoder module(s) 214 is also known as a recognition engine or classifier, and uses stored known reference patterns of speech. Like the test patterns, the reference patterns are defined as a concatenation of related acoustic frames and corresponding parameters. The decoder module(s) 214 compares and contrasts the acoustic feature vectors of a subword test pattern to be recognized with stored subword reference patterns, assesses the magnitude of the differences or similarities therebetween, and ultimately uses decision logic to choose a best matching subword as the recognized subword. In general, the best matching subword is that which corresponds to the stored known reference pattern that has a minimum dissimilarity to, or highest probability of being, the test pattern as determined by any of various techniques known to those skilled in the art to analyze and recognize subwords. Such techniques can include dynamic time-warping classifiers, artificial intelligence techniques, neural networks, free phoneme recognizers, and/or probabilistic pattern matchers such as Hidden Markov Model (HMM) engines.

HMM engines are known to those skilled in the art for producing multiple speech recognition model hypotheses of acoustic input. The hypotheses are considered in ultimately identifying and selecting that recognition output which represents the most probable correct decoding of the acoustic input via feature analysis of the speech. More specifically, an HMM engine generates statistical models in the form of an "N-best" list of subword model hypotheses ranked according to HMM-calculated confidence values or probabilities of an observed sequence of acoustic data given one or another subword such as by the application of Bayes' Theorem.

A Bayesian HMM process identifies a best hypothesis corresponding to the most probable utterance or subword sequence for a given observation sequence of acoustic feature vectors, and its confidence values can depend on a variety of factors including acoustic signal-to-noise ratios associated with incoming acoustic data. The HMM can also include a statistical distribution called a mixture of diagonal Gaussians, which yields a likelihood score for each observed feature vector of each subword, which scores can be used to reorder the N-best list of hypotheses. The HMM engine can also identify and select a subword whose model likelihood score is highest.

In a similar manner, individual HMMs for a sequence of subwords can be concatenated to establish single or multiple word HMM. Thereafter, an N-best list of single or multiple word reference patterns and associated parameter values may be generated and further evaluated.

In one example, the speech recognition decoder 214 processes the feature vectors using the appropriate acoustic models, grammars, and algorithms to generate an N-best list of reference patterns. As used herein, the term reference patterns is interchangeable with models, waveforms, templates, rich signal models, exemplars, hypotheses, or other types of references. A reference pattern can include a series of feature vectors representative of one or more words or subwords and can be based on particular speakers, speaking styles, and audible environmental conditions. Those skilled in the art will recognize that reference patterns can be generated by suitable reference pattern training of the ASR system and stored in memory. Those skilled in the art will also recognize that stored reference patterns can be manipulated, wherein parameter values of the reference patterns are adapted based on differences in speech input signals between reference pattern training and actual use of the ASR system. For example, a set of reference patterns trained for one vehicle occupant or certain acoustic conditions can be adapted and saved as another set of reference patterns for a different vehicle occupant or different acoustic conditions, based on a limited amount of training data from the different vehicle occupant or the different acoustic conditions. In other words, the reference patterns are not necessarily fixed and can be adjusted during speech recognition.

Using the in-vocabulary grammar and any suitable decoder algorithm(s) and acoustic model(s), the processor accesses from memory several reference patterns interpretive of the test pattern. For example, the processor can generate, and store to memory, a list of N-best vocabulary results or reference patterns, along with corresponding parameter values. Illustrative parameter values can include confidence scores of each reference pattern in the N-best list of vocabulary and associated segment durations, likelihood scores, signal-to-noise ratio (SNR) values, and/or the like. The N-best list of vocabulary can be ordered by descending magnitude of the parameter value(s). For example, the vocabulary reference pattern with the highest confidence score is the first best reference pattern, and so on. Once a string of recognized subwords are established, they can be used to construct words with input from the word models 222 and to construct sentences with the input from the language models 224.

Finally, the post-processor software module(s) 276 receives the output data from the decoder module(s) 214 for any suitable purpose. In one example, the post-processor software module(s) 276 can identify or select one of the reference patterns from the N-best list of single or multiple word reference patterns as recognized speech. In another example, the post-processor module(s) 276 can be used to convert acoustic data into text or digits for use with other aspects of the ASR system or other vehicle systems. In a further example, the post-processor module(s) 276 can be used to provide training feedback to the decoder 214 or pre-processor 212. More specifically, the post-processor 276 can be used to train acoustic models for the decoder module(s) 214, or to train adaptation parameters for the pre-processor module(s) 212.

And, as will be evident from the discussion below, the ASR system can be included in a client device, such as vehicle 12 or mobile device 90, and/or included in a server device, such as a server located at remote facility 80. At least according to some embodiments, the ASR system located at the remote server can include more processing power, as well as more speech recognition information that can be used to provide a more powerful ASR system than that which is located at the client device; however, as those skilled in the art will appreciate, other embodiments exist.

The ASR system or parts thereof can be implemented in a computer program product embodied in a computer readable medium and including instructions usable by one or more processors of one or more computers of one or more systems to cause the system(s) to implement the neural network speech arbitration process. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media, which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

Speech Recognition Arbitration—

As noted above, in some examples two different automatic speech recognition (ASR) algorithms may include (1) a local or vehicle-embedded speech recognition algorithm, and (2) a remote speech recognition algorithm. Merely as one example, telematics unit 30 of the vehicle 12 may have an ASR algorithm as a local ASR engine, while the remote facility 80 provides the remote ASR engine. In these approaches, results from the vehicle 12 and remote facility 80 each may be used to determine content of speech depending on confidence levels (e.g., low, medium, and high) associated with a speech topic result and a speech slotted value result for each.

Referring now to FIG. 4, examples are provided for selecting ASR results from two different ASR methodologies, e.g., a local ASR and a remote ASR. Using a natural language understanding (NLU) heuristic, a topic value (e.g., one of navigation, audio, phone command, e-mail/SMS message command, etc.) and a slot value may be determined for a given speech input using both local and remote ASR engines. Confidence levels associated with each of the local and remote ASR results engines may then be analyzed to determine whether one of the results should be selected, and if so, which of the two results should be selected.

Generally, if both local ASR results and remote/server ASR results have a high confidence level for the topic or slot value, then the remote ASR result shall be determined by the vehicle 12 (or presented to the user for confirmation) under a "server-on-top" method. In an "embedded-on-top" methodology, on the other hand, the embedded or local ASR results are used where confidence levels associated with each are the same.

Generally, the example methodology illustrated in FIG. 4 will select the result associated with the higher confidence level result in a comparison between the local and remote ASR results, so long as the higher confidence level result is at least a medium confidence level. In cases where both local and remote results having the same confidence level, e.g., both remote and server ASR results are low, medium, or high confidence levels, a default one of the remote and server ASR algorithms may be selected, such that any tie is resolved in favor of the default ASR algorithm. Moreover, as noted above, in cases where both the remote and server ASR results have a low confidence level, in some cases the low confidence level results (for either the topic or slot value associated with the speech input) may be used to reach a determination as to the intended command in the speech input.

Usage of low confidence level results may occur in several example approaches. In one approach, where a topic is determined with low confidence by both the remote and local ASR engines, the results may be nevertheless used so long as the remote and local ASR results match. For example, if both the embedded/local and server/remote results determined the same topic with a low confidence level, that topic may be presented to the user by the vehicle 12 for confirmation, e.g., the vehicle 12 may ask the user "Did you say a <Topic> Command?" Example topics may include navigation, audio commands, phone commands, or any other vehicle-related topic or function that is convenient. In this manner, the request for confirmation may be reassuring to the user. Upon confirmation of the topic from the user, the vehicle 12 could request the user to provide a follow-up command in the given topic. In one example, where the user confirms that the topic is "navigation," the vehicle 12 cold request that the user "please say the name of the point-of-interest or destination." In this manner, the user may be more likely to continue with the speech session, having the general topic confirmed, and despite the low confidence level in the initial results for the topic.

In cases where the local and server ASR each determine a topic with a low confidence level, but the topics do not match (e.g., one determines a topic of navigation, while the other determines a topic of audio system), the topic results may nevertheless be used in the determination of the content of the speech command. For example, if the slotted values determined by either the local or server ASR have at least a threshold confidence level (e.g., a medium confidence level), the vehicle 12 may ask the user for further assistance. More specifically, the vehicle 12 may request that the user select a topic applicable to the command, by providing a menu of available speech command topics. Merely as one example, the vehicle 12 may display a request or play audio to the user seeking a menu input, e.g., "I am making effort to understand your request, please select the appropriate request from the displayed list." A list of available topics may be presented to the user, such as Navigation, Music, Radio Tuner, Email/SMS Message, etc. Once the user selects which topic is associated with their command, the vehicle 12 and/or remote facility 80 may present slotted values associated with the user-confirmed topic. In other words, the selection of a topic input received from the user may be used to resolve the appropriate topic, and to identify one or more slotted values corresponding to that topic. For example, if the user indicates that the topic is Navigation, the vehicle 12 may say or display to the user a list of points-of-interest corresponding to the slotted values, e.g., "Did you say, 1) Big Apple Bagels 2) Apple Retail Store 3) Appleton realtors?" In this manner, the user may be more likely to continue with the speech session to completion, given the request by the vehicle 12 for more information related to the command by way of the request that the user confirm the associated topic.

Method—

Figure 3:
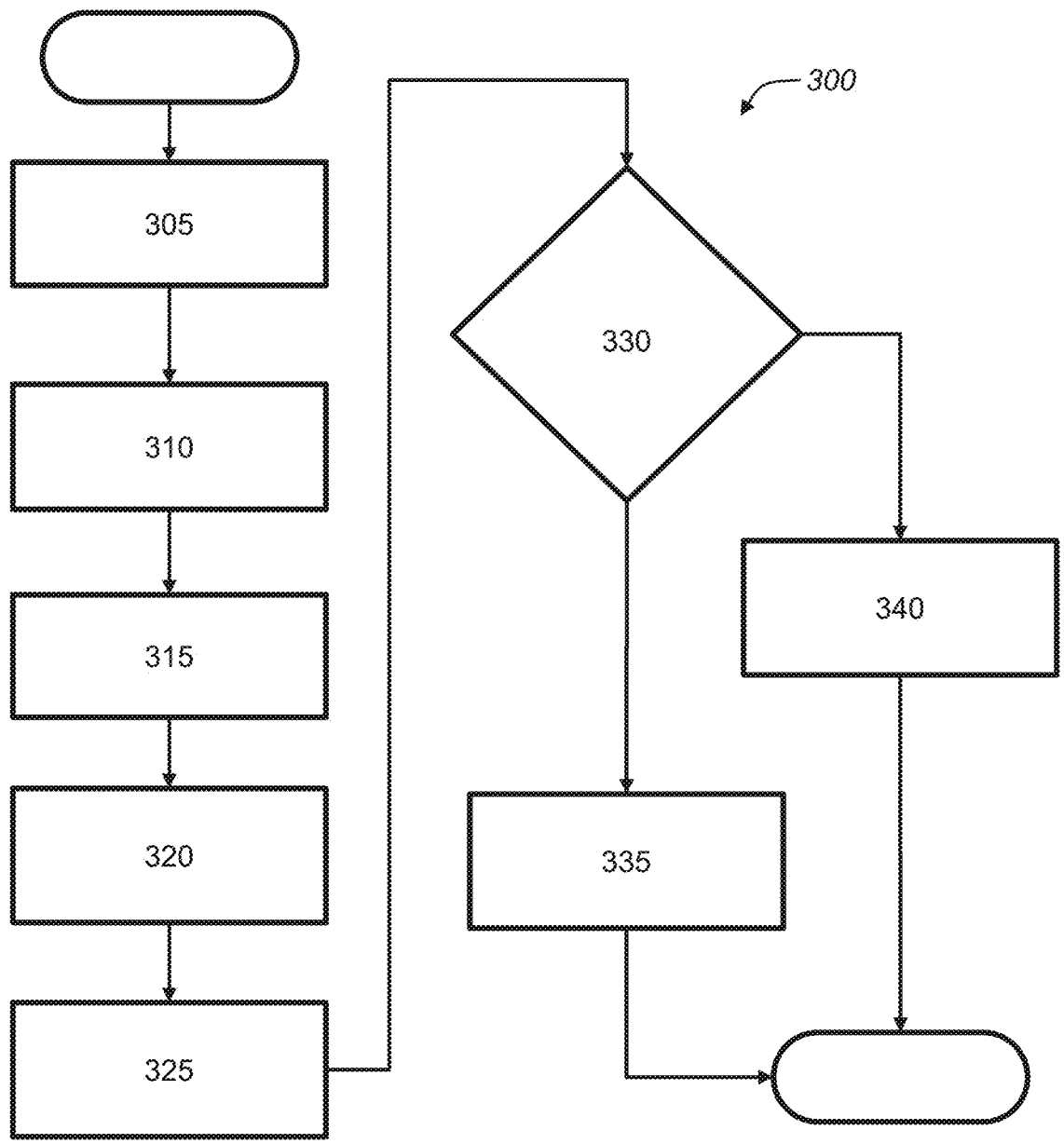
FIG. 3 is a process flow diagram illustrating exemplary methods of arbitrating between speech recognition algorithms.

Turning now to FIG. 3, a process flow diagram is illustrated representing example methods of displaying content from one or more mobile devices in a vehicle. Process 300 may be carried out using the system of FIGS. 1 and 2. It begins at block 305, where speech is received at a microphone installed to a vehicle; for example, by microphone 56 installed in vehicle 12 as a part of the vehicle electronics 20. For example, an occupant of vehicle 12 may initiate a speech session and provide a command. Process 300 may then proceed to block 310.

At block 310, speech results may be determined using a first algorithm, including a first speech topic and a first speech slotted value. In some examples, the first algorithm may be a local algorithm, e.g., running on a processor or computing system installed to the vehicle 12, such as the telematics unit 30.

Proceeding to block 315, a first speech topic confidence level for the first speech topic is determined, as well as a first speech value confidence level for the first speech slotted value. In an example, the confidence levels are each determined without using numerical scores or normalization. Rather, in these examples the local speech topic confidence level and the local speech value confidence level are determined to be one of a high level, a medium level, or a low level. Process 300 may then proceed to block 320.

At block 320, speech results may be determined using a second algorithm different from the first algorithm. The speech results may include a second speech topic and a second speech slotted value. In some examples, the second algorithm may be determined at a remote server, e.g., running on a processor or computing system remote from the vehicle 12, such as at the remote facility 80. In these examples, the second speech recognition algorithm or engine is not limited by vehicle electronics, which are relatively limited due to space, weight, and other vehicle design factors.

Proceeding to block 325, a second speech topic confidence level for the second speech topic is determined, as is a second speech value confidence level for the second speech slotted value. In some example approaches, as with the results for the first speech recognition steps in blocks 310 and 315, the confidence levels are each determined without using numerical scores or normalization. For examples, the second/remote speech topic confidence level and the second speech value confidence level may be determined to be one of a high level, a medium level, or a low level. Process 300 may then proceed to block 330.

At block 330, process 300 may query whether the first speech topic confidence level of the first speech topic (i.e., as determined at block 315), and the second speech topic confidence level of the second speech topic (i.e., as determined at block 325), are both a low confidence level. Where either the first speech topic confidence level of the first speech topic or the second speech topic confidence level of the second speech topic are not low confidence levels, process 300 may proceed to block 335. At block 335, speech recognition may be determined using one or both of the first and second speech topic results.

If the result in block 330 is yes, i.e., that both the first speech topic confidence level of the first speech topic and the second speech topic confidence level of the second speech topic are low, process 300 may proceed to block 340. At block 340, at least one of the determined first speech topic and the received second speech topic are used to determine the topic associated with the received speech. For example, as noted above where the speech topics determined by the first and second ASR algorithms match, they may be used to determine the intended command. Alternatively, if the topics do not match, a user input may be requested to confirm the topic, and then slotted values corresponding to the confirmed topic may be presented to the user. Process 300 may then terminate.

Accordingly, the usage of low-confidence results by vehicle 12 and remote facility 80 may generally provide an improved task completion rate. As discussed above, some intelligence may be extracted from the low-confidence results by resolving the topic classification between the local and remote results, using additional inputs from the user if necessary. This improvement in task completion rate may in turn improve the user experience, but increasing the rate at which speech sessions are successfully completed.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of recognizing speech, comprising:
   (a) receiving speech at a microphone installed in a vehicle;
   (b) determining local speech results using a natural language understanding methodology, including a local speech topic and a local speech slotted value, using electronics installed to the vehicle;
   (c) determining a local speech topic confidence level for the local speech topic, and determining a local speech value confidence level for the local speech slotted value;
   (d) receiving remote speech results, including a remote speech topic and a remote speech slotted value at the vehicle;
   (e) receiving a remote speech topic confidence level for the remote speech topic, and receiving a remote speech slotted value confidence level for the remote speech slotted value;

(f) when the local speech topic confidence level of the local speech topic determined in step (b), and the remote speech topic confidence level of the remote speech topic received in step (d) are both a low confidence level, using at least one of the determined local speech topic and the received remote speech topic to determine the topic associated with the received speech; and
(g) determining the local speech topic confidence level and the local speech value confidence level including a high level, a medium level, and a low level confidence only, and without determining a numerical value for the local speech topic confidence level and the local speech value confidence level.

2. The method of claim 1, further comprising the step of:
(h) when the local speech topic matches the remote speech topic, requesting a user confirmation of the speech topic associated with the received speech.

3. The method of claim 2, further comprising the step of:
(i) when the user confirms the local speech topic, requesting a user input associated with the local speech topic.

4. The method of claim 1, further comprising the step of:
(h) when the determined local speech topic is different from the remote speech topic, requesting a user topic selection of the speech topic.

5. The method of claim 4, further comprising the step of:
(i) in response to the user topic selection, providing a user menu selection including a plurality of slotted values associated with the user topic selection.

6. The method of claim 5, further comprising the step of:
(i) in response to the user topic selection, discarding at least one of the local speech slotted values or the remote speech slotted values, the at least one of the local speech slotted values or the remote speech slotted values not associated with the user topic selection.

7. A method of recognizing speech using first and second speech recognition algorithms, comprising:
(a) receiving speech at a microphone installed in a vehicle;
(b) determining speech results using a first algorithm, including a first speech topic and a first speech slotted value;
(c) determining a first speech topic confidence level for the first speech topic, and determining a first speech value confidence level for the first speech slotted value;
(d) receiving second speech results determined with a second algorithm different from the first algorithm, including a second speech topic and a second speech slotted value at the vehicle;
(e) receiving a second speech topic confidence level for the second speech topic, and receiving a second speech slotted value confidence level for the second speech slotted value; and
(f) when the first speech topic confidence level of the first speech topic determined in step (b), and the second speech topic confidence level of the second speech topic received in step (d) are both a low confidence level, using at least one of the determined first speech topic and the received second speech topic to determine the topic associated with the received speech;
wherein the first speech recognition algorithm is a local speech recognition algorithm determined using a natural language understanding heuristic embedded in electronics installed in the vehicle.

8. The method of claim 7, wherein the second speech recognition algorithm is a remote speech recognition algorithm received from a remote facility at the vehicle.

9. The method of claim 7, further comprising the step of:
(g) when the first speech topic matches the second speech topic, requesting a user confirmation of the speech topic associated with the received speech.

10. The method of claim 9, further comprising the step of:
(h) when the user confirms the first speech topic, requesting a user input associated with the first speech topic.

11. The method of claim 7, further comprising the step of:
(g) when the determined first speech topic is different from the second speech topic, requesting a user topic selection of the speech topic.

12. The method of claim 11, further comprising the step of:
(h) in response to the user topic selection, providing a user menu selection including a plurality of slotted values associated with the user topic selection.

13. The method of claim 12, further comprising the step of:
(i) in response to the user topic selection, discarding at least one of the first speech slotted values or the second speech slotted values, the at least one of the local speech slotted values or the second speech slotted values not associated with the user topic selection.

14. The method of claim 7, further comprising determining the local speech topic confidence level and the local speech value confidence level including a high level, a medium level, and a low level confidence only, and without determining a numerical value for the local speech topic confidence level and the local speech value confidence level.

15. A non-transitory computer readable medium containing program instructions for recognizing speech in a vehicle, wherein execution of the program instructions by one or more processors installed to the vehicle causes the one or more processors to carry out the steps of:
(a) receiving speech at a microphone installed in the vehicle;
(b) determining local speech results, including a local speech topic and a local speech slotted value, using electronics installed to the vehicle;
(c) determining a local speech topic confidence level for the local speech topic, and determining a local speech value confidence level for the local speech slotted value;
(d) receiving remote speech results, including a remote speech topic and a remote speech slotted value at the vehicle;
(e) receiving a remote speech topic confidence level for the remote speech topic, and receiving a remote speech slotted value confidence level for the remote speech slotted value;
(f) when the local speech topic confidence level of the local speech topic determined in step (b), and the remote speech topic confidence level of the remote speech topic received in step (d) are both a low confidence level, using at least one of the determined local speech topic and the received remote speech topic to determine the topic associated with the received speech; and
(g) when the local speech topic matches the remote speech topic, requesting a user confirmation of the speech topic associated with the received speech.

16. The non-transitory computer readable medium of claim 15, wherein execution of the program instructions by one or more processors installed to the vehicle causes the one or more processors to carry out the step of:
(h) when the user confirms the local speech topic, requesting a user input associated with the local speech topic.

17. The non-transitory computer readable medium of claim 15, wherein execution of the program instructions by one or more processors installed to the vehicle causes the one or more processors to carry out the steps of:
- (h) when the determined local speech topic is different from the remote speech topic, requesting a user topic selection of the speech topic; and
- (i) in response to the user topic selection, providing a user menu selection including a plurality of slotted values associated with the user topic selection.

* * * * *